US012165505B2

(12) United States Patent
Neyama et al.

(10) Patent No.: US 12,165,505 B2
(45) Date of Patent: Dec. 10, 2024

(54) INFORMATION PROVIDING SYSTEM, INFORMATION PROVIDING DEVICE, AND COMPUTER-READABLE RECORDING MEDIUM

(71) Applicant: TOYOTA JIDOSHA KABUSHIKI KAISHA, Toyota (JP)

(72) Inventors: Ryo Neyama, Toyota (JP); Kenichi Murata, Koto-ku (JP); Teruo Koyanagi, Toyota (JP); Sylvain Lefebvre, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 448 days.

(21) Appl. No.: 17/241,457

(22) Filed: Apr. 27, 2021

(65) Prior Publication Data

US 2021/0383685 A1 Dec. 9, 2021

(30) Foreign Application Priority Data

Jun. 9, 2020 (JP) .................................. 2020-100024

(51) Int. Cl.
*G08G 1/01* (2006.01)
*G08G 1/065* (2006.01)
*H04W 4/40* (2018.01)

(52) U.S. Cl.
CPC ......... *G08G 1/0125* (2013.01); *G08G 1/0112* (2013.01); *G08G 1/065* (2013.01); *H04W 4/40* (2018.02)

(58) Field of Classification Search
CPC .... G08G 1/0125; G08G 1/0112; G08G 1/065; G08G 1/096866; G08G 1/0129;
(Continued)

(56) References Cited

U.S. PATENT DOCUMENTS 9,578,093 B1 * 2/2017 Gotoh ................ G06Q 10/0637
2011/0054874 A1 3/2011 Ikeda et al.
(Continued)

FOREIGN PATENT DOCUMENTS

JP 2005-9891 A 1/2005
JP 2010-210284 A 9/2010
(Continued)

OTHER PUBLICATIONS

Suzumura et al., "X10-based Massive Parallel Large-Scale Traffic Flow Simulation", Provision, IBM Japan, No. 72, 2012, 18 pages (with English Translation).

*Primary Examiner* — Aniss Chad
*Assistant Examiner* — Stephanie T Su
(74) *Attorney, Agent, or Firm* — Oblon, McClelland, Maier & Neustadt, L.L.P.

(57) ABSTRACT

An information providing system includes: first servers in which each first server including a first processor with hardware is provided for each of a plurality of bases. The first processor is configured to calculate a traffic frequency of a vehicle on a road link included in a road map based on past travel data of the vehicle, partition the road map into a plurality of areas so that a total of the traffic frequency in a road link straddling each partitioned area becomes minimum, allocate each base to each of the partitioned areas, and output predetermined information to the vehicle traveling in the partitioned area to which the base is allocated.

9 Claims, 6 Drawing Sheets

(58) Field of Classification Search
CPC ....... G08G 1/096716; G08G 1/096741; G08G 1/096775; G08G 1/096811; G08G 1/096816; H04W 4/40; H04W 4/029; H04W 4/44
See application file for complete search history.

(56) References Cited

U.S. PATENT DOCUMENTS

| | | | |
|---|---|---|---|
| 2015/0067695 A1 | 3/2015 | Hamamoto et al. | |
| 2017/0255966 A1* | 9/2017 | Khoury | B60W 40/00 |
| 2017/0366604 A1* | 12/2017 | McDuff | H04L 47/822 |

FOREIGN PATENT DOCUMENTS

| | | |
|---|---|---|
| JP | 2011-48757 A | 3/2011 |
| WO | WO 2013/145001 A1 | 10/2013 |

* cited by examiner

INFORMATION PROVIDING SYSTEM, INFORMATION PROVIDING DEVICE, AND COMPUTER-READABLE RECORDING MEDIUM

CROSS-REFERENCE TO RELATED APPLICATION(S)

The present application claims priority to and incorporates by reference the entire contents of Japanese Patent Application No. 2020-100024 filed in Japan on Jun. 9, 2020.

BACKGROUND

1. Technical Field

The present disclosure relates to an information providing system, an information providing device, and a computer-readable recording medium.

2. Related Art

Toyotarou Suzumura, four others, "X10-based Massive Parallel Large-Scale Traffic Flow Simulation", Provision, IBM Japan, 2012, No. 72, p. 74-80 discloses a simulation in which a road network is partitioned into a plurality of areas and one area is allocated to one node of a parallel computer, using area partition algorithm METIS.

A technology capable of efficiently performing data exchange when an actual vehicle (connected car) including a wireless communication unit communicates with a plurality of bases as well as a simulation has been required.

SUMMARY

In some embodiments, an information providing system includes: first servers in which each first server including a first processor with hardware is provided for each of a plurality of bases. The first processor is configured to calculate a traffic frequency of a vehicle on a road link included in a road map based on past travel data of the vehicle, partition the road map into a plurality of areas so that a total of the traffic frequency in a road link straddling each partitioned area becomes minimum, allocate each base to each of the partitioned areas, and output predetermined information to the vehicle traveling in the partitioned area to which the base is allocated.

In some embodiments, an information providing device includes a processor with hardware, the information providing device being provided for each of a plurality of bases. The processor is configured to calculate a traffic frequency of a vehicle on a road link included in a road map based on past travel data of the vehicle, partition the road map into a plurality of areas so that a total of the traffic frequency in a road link straddling each partitioned area becomes minimum, allocate each base to each of the partitioned areas, and output predetermined information to the vehicle traveling in the partitioned area to which the base is allocated.

In some embodiments, provided is a non-transitory computer-readable recording medium with an executable program stored thereon. The program causes a processor with hardware to execute: calculating a traffic frequency of a vehicle on a road link included in a road map based on past travel data of the vehicle, partitioning the road map into a plurality of areas so that a total of the traffic frequency in a road link straddling each partitioned area becomes minimum, allocating a base to each of the partitioned areas, and outputting predetermined information to the vehicle traveling in the partitioned area to which the base is allocated.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

An information providing system, an information providing device, and an information providing program according to an embodiment of the present disclosure will be described with reference to the drawings. Note that components in the following embodiment include those that can be easily replaced by those skilled in the art or those that are substantially the same.

The information providing system, the information providing device, and the information providing program according to the embodiment are for providing predetermined information to vehicles by performing communication between geographically dispersed base groups and the vehicles. Here, conventionally, a simulation of partitioning a road network using an area partition algorithm has been performed, but it has, for example, the following problems.

(1) It is for the purpose of simulating a virtual vehicle, and is premised on the use of a tightly coupled parallel computer cluster. For this reason, nodes in the parallel computer cluster are homogeneous, and for example, an influence of a position of a vehicle on a latency (communication delay) or a bandwidth of a network is not assumed.

(2) Since an index for partitioning the area is an equalization of the number of intersecting points and does not consider a traffic volume of vehicles between areas, data exchange or processing according to the movement of vehicles between the areas increases.

(3) In a case of allocating bases to the partitioned areas, respectively, it is generally assumed that processing capabilities of each node are not the same as each other and the position of the vehicle has an influence on the latency or the bandwidth of the network. For this reason, if allocation is performed without considering the above, there is a possibility that the latency cannot be tolerated or the bandwidth will be tight, and there is a possibility that an operation cost of each base will not be optimal.

(4) Since a target is a virtual vehicle, the vehicle exists in a memory of a node, and it is not necessary to transmit data to the vehicle and the node. On the other hand, in an actual vehicle, the vehicle and the base are geographically dispersed, and it is thus difficult to simply apply a conventional method to the actual vehicle.

Therefore, the information providing system, the information providing device, and the information providing program according to the embodiment provide a mechanism capable of improving efficiency of data exchange between geographically dispersed base groups and vehicles.

Information Providing System

Figure 1:
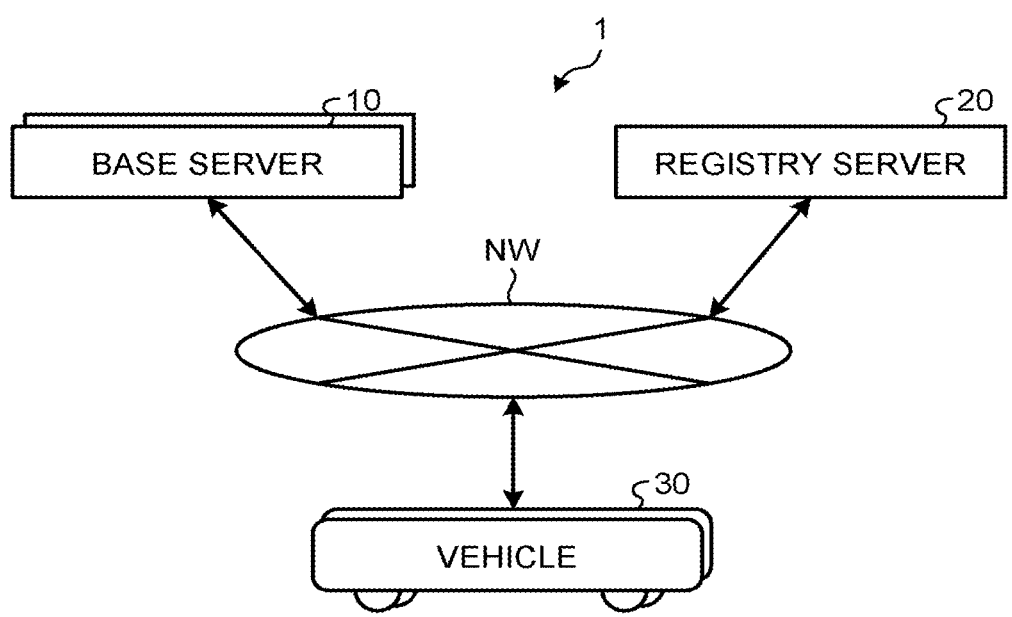
FIG. 1 is a diagram schematically illustrating a configuration of an information providing system according to an embodiment.

The information providing system according to the present embodiment will be described with reference to FIGS. 1 to 5. The information providing system 1 includes a plurality of base servers (first servers) 10, a registry server (second server) 20, and a plurality of vehicles 30, as illustrated in FIG. 1. Specifically, the information providing device according to the embodiment is realized by a function of the base server 10. All of the base server 10, the registry server 20, and the vehicle 30 have a communication function and are configured to be able to communicate with each other through a network NW. This network NW is composed of, for example, an Internet network, a mobile phone network, or the like.

Base Server

The base server 10 is for providing predetermined information and service to the vehicle 30, for example, in response to a request from the vehicle 30. The base server 10 is realized by a general-purpose computer such as a workstation or a personal computer.

Figure 2:
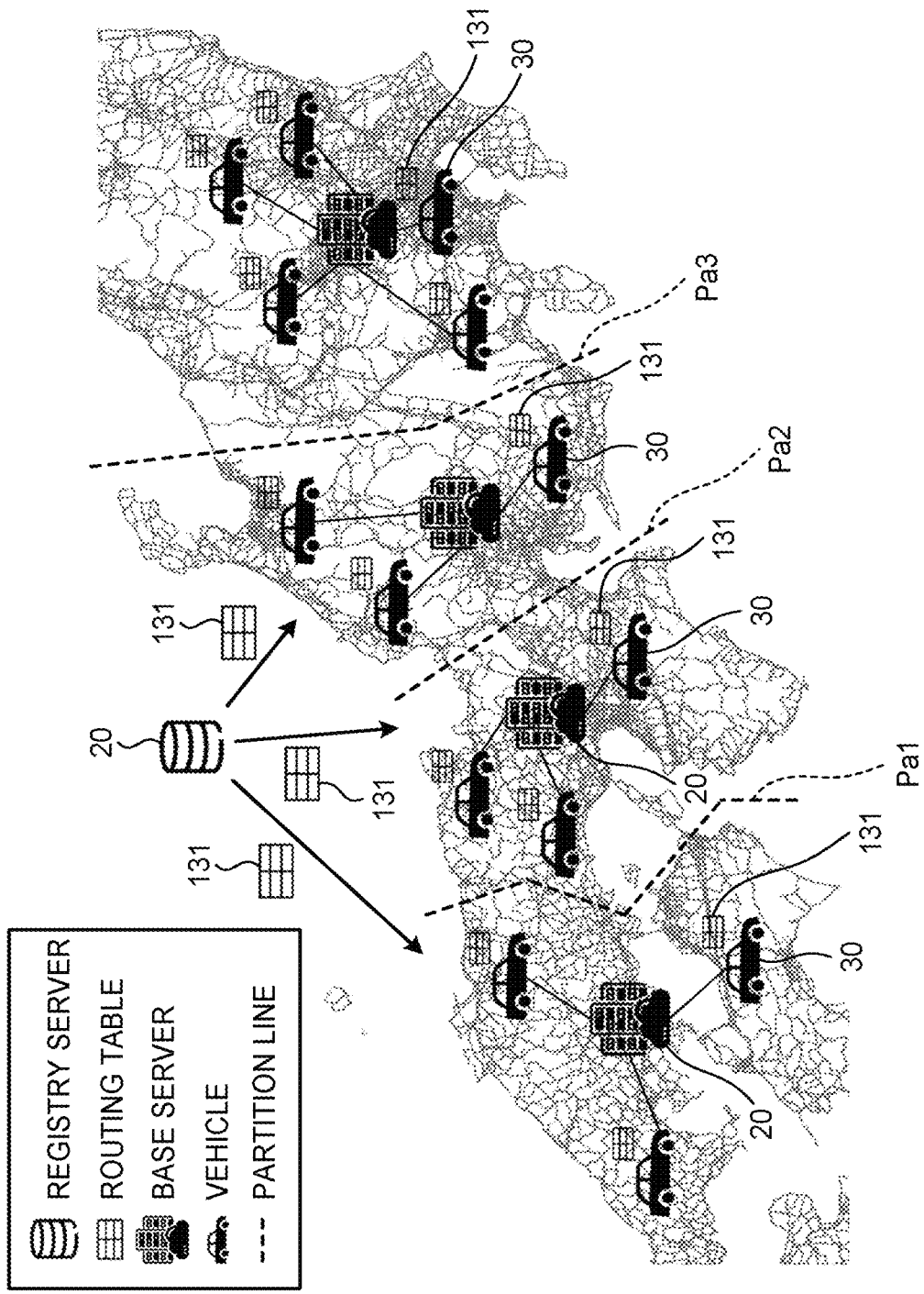
FIG. 2 is a diagram for describing an outline of a base server and a registry server in the information providing system according to the embodiment.

In the present embodiment, it is premised that a plurality of bases are provided at geographically separated places, and the base server 10 is provided for each of the bases. That is, the base server 10 is provided in each of a plurality of geographically dispersed bases, as illustrated in FIG. 2. Note that the "base" refers to a data center that communicates with the vehicle 30 to perform data exchange. In an example illustrated in FIG. 2, the bases are set up in four areas, Chugoku-Shikoku (Chugoku+Shikoku), Kansai, Chubu, and Kanto, and a total of four base servers 10 are also provided. In addition, in FIG. 2, a solid line connecting the base server 10 and the vehicle 30 to each other means that the base server 10 and the vehicle 30 communicate with each other.

Figure 3:
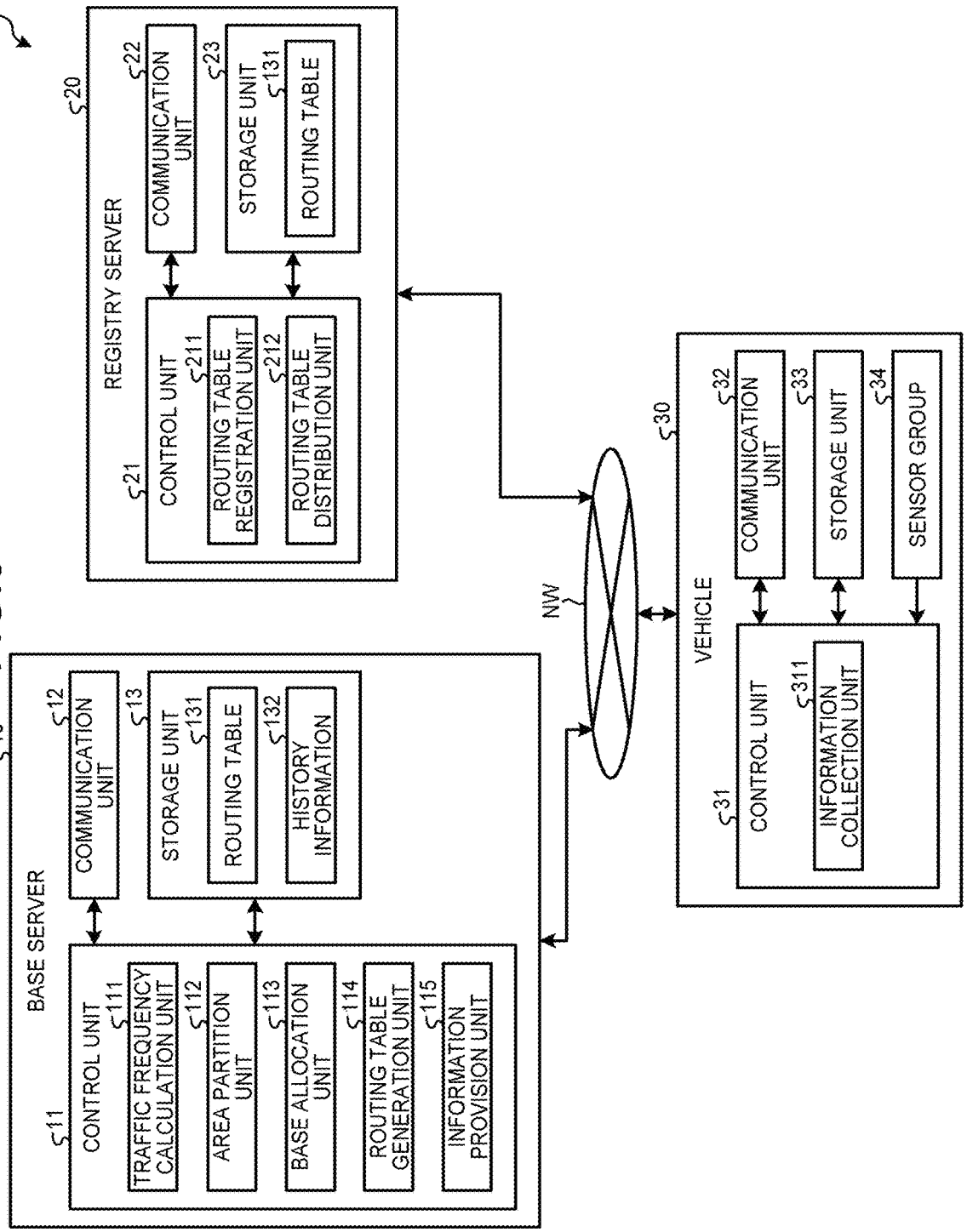
FIG. 3 is a block diagram illustrating details of each component of the information providing system according to the embodiment.

The base server 10 includes a control unit (first processor) 11, a communication unit 12, and a storage unit 13, as illustrated in FIG. 3. Specifically, the control unit 11 includes a processor composed of a central processing unit (CPU), a digital signal processor (DSP), a field-programmable gate array (FPGA), or the like, and a memory (main storage unit) composed of a random access memory (RAM), a read only memory (ROM), or the like.

The control unit 11 realizes a function that meets a predetermined purpose by loading a program stored in the storage unit 13 into a work area of the main storage unit and executing the program and controlling each component or the like through the execution of the program. The control unit 11 functions as a traffic frequency calculation unit 111, an area partition unit 112, a base allocation unit 113, a routing table generation unit 114, and an information provision unit 115 through the execution of the program.

The traffic frequency calculation unit 111 calculates a traffic frequency of the vehicle 30 on a road link included in a road map on the basis of the past travel data of the vehicle 30. The past travel data of the vehicle 30 is previously collected, for example, and is stored in the storage unit 13.

Here, in a case where a static road map is graph G (undirected graph G composed of node V and edge E), an intersecting point on the road map is node V, a road link is edge E, and a weight for edge E is W, they can be represented as in, for example, the following Equations (1) to (4).

GRAPH: $G=\{V,E\}$ (1)

NODE: $V=\{v_i\}$ (2)

EDGE: $E=\subseteq\{(v_i,v_j)|i\neq j, v_i, v_j \in E\}$ (3)

WEIGHT FOR EDGE: $W=\{w_i\}$ (4)

As represented in the above Equation (4), the weight W obtained from the traffic frequency of the vehicle 30 is allocated to each edge. The weight W is set to a larger value as the traffic frequency of the vehicle 30 becomes larger.

The area partition unit 112 partitions the road map (map data) into a plurality of areas. Specifically, the area partition unit 112 partitions the road map into a plurality of areas so that a total of the traffic frequency in a road link straddling each partitioned area becomes minimum. By partitioning the road map so as to minimize a traffic volume of the road link between the areas as described above, it is possible to minimize data exchange between the areas (between the bases provided in each area). A specific method of area partition will hereinafter be described.

First, the area partition unit 112 uses the traffic frequency calculated by the traffic frequency calculation unit 111 as a weight, uses a preset number of bases (for example, four (see FIG. 2)) as the number of partitions, and then partitions nodes (intersecting points) using a known area partition algorithm (see Toyotarou Suzumura, four others, "X10-based Massive Parallel Large-Scale Traffic Flow Simulation", Provision, IBM Japan, 2012, No. 72, p. 74-80) so that a total of the traffic frequency between partitions becomes minimum. Note that the "partition (partition set)" refers to a set of nodes in an area partitioned by partition lines illustrated by broken lines in FIG. 2.

In the example illustrated in FIG. 2, four partitions are set by three partition lines Pa1, Pa2, and Pa3. In addition, the "traffic frequency between partitions" refers to a traffic frequency of a road link straddling two partitioned areas (partitions). In addition, in the present embodiment, the road link straddling the two partitioned areas is defined as a "border".

Here, in a case where the partition set is $G^{(p)}$, the road link straddling the two partitioned areas is border B, and a weight of border B is $W^{(b)}$, they can be represented as in the following Equations (5) to (7). In addition, an objective function at the time of area partition can be represented as in the following Equation (8).

PARTITION SET: $G^{(p)} =$ (5)
$$\{P_i \mid P_i \subseteq V, \forall i, j, i \neq j P_i \cap P_j = \phi \wedge \bigcup_i P_i = V\}$$

BORDER: $B = \{(v, u) \mid v \in P_i \wedge u \in P_j, P_j, i \neq j\}$ (6)

WEIGHT OF BORDER: $W^{(b)} = \{w_i^{(b)}\}$ (7)

OBJECTIVE FUNCTION: $\operatorname{argmin}\Sigma w_i^{(b)}$ (8)

The area partition unit 112 partitions the nodes (intersecting points) by finding a solution that satisfies the objective function represented in the above Equation (8). Subsequently, the area partition unit 112 partitions the edges (road links). The area partition unit 112 partitions each edge by a partition allocated to each node as represented in, for example, the following Equation (9).

$$\text{EDGE PARTITION: } E^{(p)} = \qquad (9)$$
$$\{E_{i,j}^{(p)} | (v, u) \in E, P_i, P_j \in G^{(p)}, v \in P_i, u \in P_j\}$$

For example, in a case where the area is partitioned by four partitions as illustrated in FIG. 2, the area partition unit 112 classifies the edges on the road map into the following seven types.

(1) Edge belonging to Chugoku and Shikoku area
(2) Edge belonging to Kansai area
(3) Edge belonging to Chubu area
(4) Edge belonging to Kanto area
(5) Edge straddling Chugoku and Shikoku area and Kansai area
(6) Edge straddling Kansai area and Chubu area
(7) Edge straddling Chubu area and Kanto area The base allocation unit 113 allocates a base to each of a plurality of partitioned areas. Note that in the present embodiment, the number (for example, four (see FIG. 2)) of bases allocated by the base allocation unit 113 is predetermined.

The base allocation unit 113 allocates the base to each of the plurality of partitioned areas so as to minimize an operation cost of the base server 10 while satisfying a preset latency constraint and communication bandwidth constraint between the vehicle 30 and the base server 10. Therefore, it is possible to realize data exchange between the vehicle 30 and the plurality of base servers 10 while suppressing the operation cost of each base server 10.

The allocation of the bases by the base allocation unit 113 may be performed by one base server 10 of the plurality of base servers 10 constituting the information providing system 1 or may be performed by the plurality of base servers 10 in cooperation with each other. In a case where the plurality of base servers 10 allocate the bases in cooperation with each other, for example, each base server 10 performs calculation of the traffic frequencies, partition of the areas, and allocation of the bases, then forms an agreement on the allocation of the bases by a method such as a majority decision, and performs the allocation of the bases according to the agreement. The plurality of base servers 10 perform the allocation of the bases in cooperation with each other as described above, such that for example, even though some base servers 10 go down, the remaining base servers 10 can allocate the bases.

In addition, the base allocation unit 113 may determine sizes of areas allocated to each base server 10 according to, for example, computer resources of each base server 10 or a network environment. In this case, the base allocation unit 113 allocates the base server 10 having good computer resources or a good network environment to a large (wide) area, and allocates the base server 10 having poor computer resources or a poor network environment to a small (narrow) area.

An example of a base allocation method by the base allocation unit 113 will be described. The base allocation unit 113 sets an optimization problem that minimizes an operation cost of the base server 10 with respect to a latency constraint, a communication bandwidth constraint, and a communication cost between the vehicle 30 and the base server 10. Then, the base allocation unit 113 allocates the base by solving this optimization problem.

Preconditions for the optimization problem are set as follows, for example.

(1) Divide an area by M×N meshes and set a mesh of column (i,j) as $g_{i,j}$.
(2) Set the number of bases as K and set a k-th base as $q_k$.
(3) In a K×M×N matrix L, an element $l_{k,i,j}$ represents an average latency of the mesh $g_{i,j}$ and the base $q_k$.
(4) Set an actual throughput and a maximum throughput of each base $q_k$ as $tp_{actual}(q_k)$ and $tp_{max}(q_k)$, respectively.

In addition, constraint conditions for the optimization problem are set as follows, for example.

(1) For the data exchange between the vehicle 30 and the base server 10, a maximum allowable latency $l_{max}$ between the vehicle 30 and the base server 10 is given, and $\forall q_k \forall g_{i,j}$ contains (area $(q_k)$, $g_{i,j}$) $\Rightarrow l_{k,i,j} \leq l_{max}$ is satisfied. Note that "contains (A,B)" represents a function that returns whether or not area B is included in area A, and "area $(q_k)$" represents an area (edge group) allocated to $q_k$.
(2) $\forall q_k tp_{actual}(q_k) \leq tp_{max}(q_k)$ is satisfied.

In addition, an objective function of the optimization problem is set as in, for example, the following Equation (10).

$$\sum_{k=1}^{K} nodecost(q_k) + \sum_{i=1}^{K} handovercost(q_k, q_j) \qquad (10)$$

Note that in the above Equation (10), "nodecost $(q_k)$" represents a cost per unit time required to operate the base $q_k$, and "handovercost $(q_k, q_j)$" represents a handover cost of the vehicle 30 between the base $q_k$ and a base $q_j$. In addition, "handover" indicates processing for sending information held by a certain base server 10 to another base server 10.

The routing table generation unit 114 generates a routing table including information on the bases allocated to the plurality of areas by the base allocation unit 113. The "routing table" indicates a correspondence table between areas and bases for specifying the base server 10 with which the vehicle 30 communicates. The routing table generation unit 114 outputs the generated routing table to the registry server 20. In addition, the routing table generation unit 114 may update the routing table as necessary, and outputs the updated routing table to the registry server 20 every time the routing table is updated.

The routing table can be realized by a plurality of methods, and a realization method of the routing table differs depending on whether or not the vehicle 30 has a map matching function. Note that the "map matching function" indicates a function of correcting position information of the vehicle 30 acquired by a global positioning system (GPS) or the like on the basis of the position of a road or the like on a map. The vehicle 30 that does not have the map matching function uses only latitude/longitude information obtained by positioning of the GPS.

Case where Vehicle has Map Matching Function
(1) One-Dimensional Indexing Method Examples of a one-dimensional indexing method include a method of using ID of an edge as a key and allocating the base server 10 to the key, or an indexing method using a binary tree, a B tree, a skip list, a hash table, or the like.

Case where Vehicle does not have Map Matching Function (1) Bitmap Method

Figure 4:
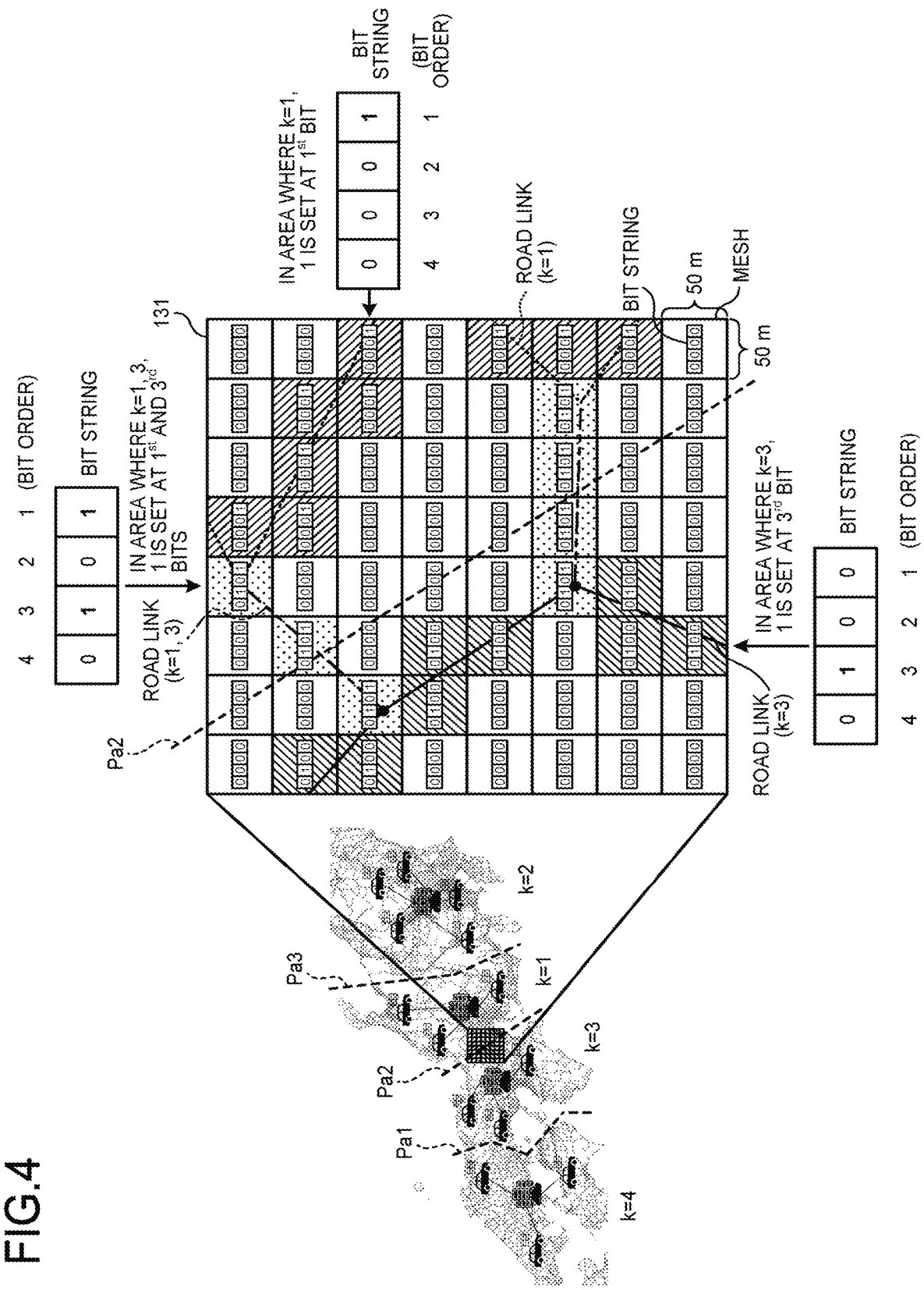
FIG. 4 is a diagram illustrating an example of a bitmap-type routing table used in the information providing system according to the embodiment.

In the bitmap method, for example, as illustrated in FIG. 4, an area of a road map, which is a target, is partitioned into N×M meshes (for example, about 3000 km×3000 km all over Japan is partitioned into 50 m meshes), and k-bit pixels are allocated to each mesh. Then, flags of bits are set for all edges (road links) included in each pixel.

FIG. 4 illustrates an example of setting flags of bits for road links included in a Kansai area, road links in a Chubu area, and road links (borders) straddling the Kansai and Chubu areas. As illustrated in FIG. 4, in the road links belonging to the Kansai area (k=3), a flag of 1 bit is set at a $3^{rd}$ bit of a bit string. In addition, in the road links belonging to the Chubu area (k=1), a flag of 1 bit is set at a $1^{st}$ bit of a bit string. Then, in the road links straddling the Kansai and Chubu areas, a flag of 1 bit is set at $1^{st}$ and $3^{rd}$ bits of a bit string.

By configuring the routing table by the bitmap method as described above, it is possible to easily specify the base server 10 allocated to the road link on which the vehicle 30 travels even in a case where the vehicle 30 does not have the map matching function. In addition, by configuring the routing table by the bitmap method, it becomes possible to refer to the routing table in a calculation amount of $O(1)$.

Figure 5:
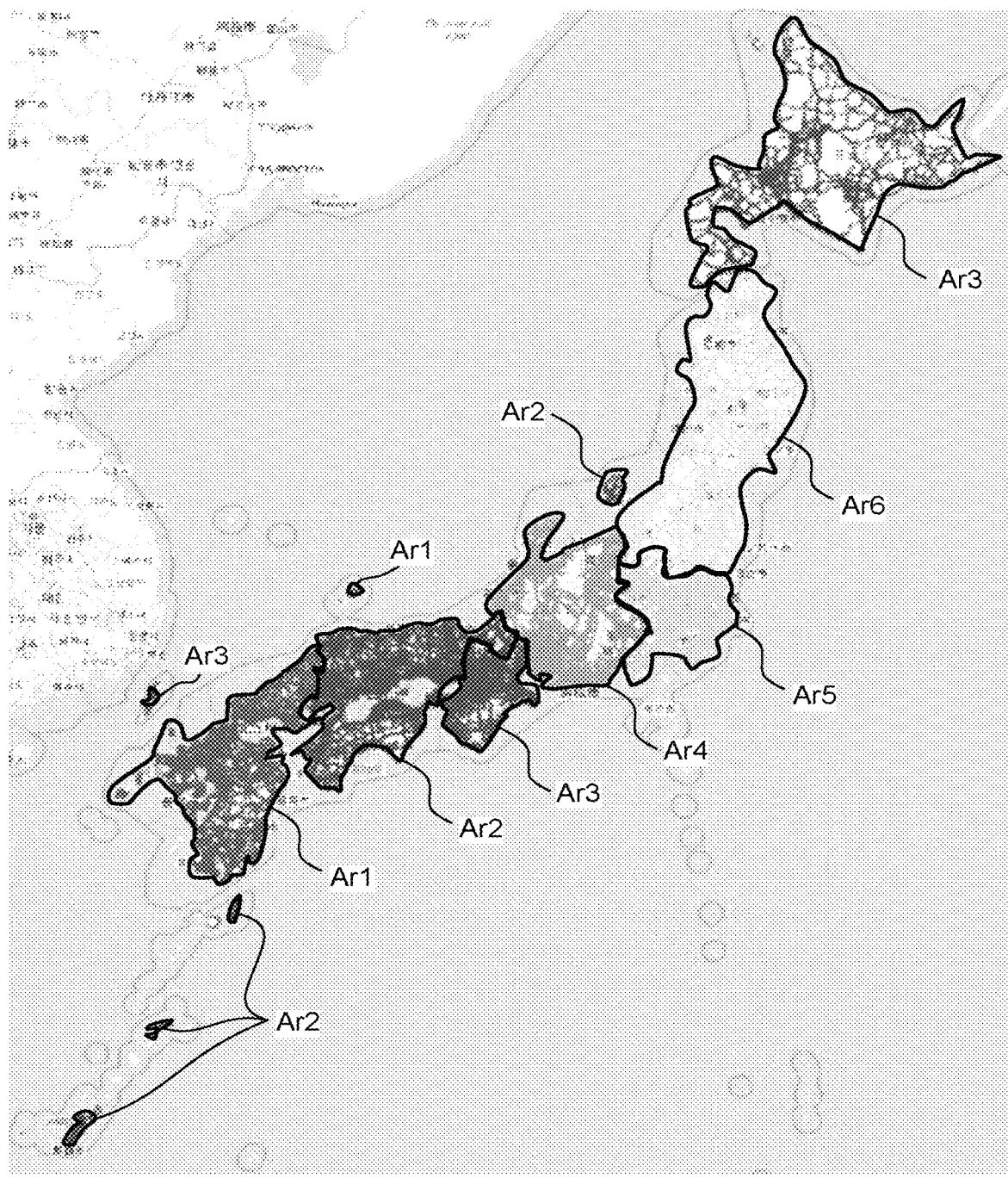
FIG. 5 is a diagram illustrating a result of partitioning a road map of the whole of Japan into a plurality of areas by the information providing system according to the embodiment.

In addition, for example, as illustrated in FIG. 5, in a case where the whole of Japan is partitioned into six areas Ar1 to Ar6 and the routing table is configured as an 8-bit gray scale, a size of a compressed routing table is about 7.3 MB. Therefore, by configuring the routing table by the bitmap method, it is possible to realize a lightweight data size suitable for an in-vehicle device.

(2) Two-Dimensional Indexing Method

Examples of a two-dimensional indexing method include a partitioning method by a K-D tree, a quadtree, or the like. By configuring the routing table by the two-dimensional indexing method, it is possible to refer to the routing table in a calculation amount of $O(\log(N))$ (N=number of edges). In addition, by configuring the routing table using the two-dimensional indexing method, it is possible to make a size of the routing table more compact and make an amount of data distributed from the registry server 20 to the vehicle 30 and a required memory size on an in-vehicle device of the vehicle 30 smaller.

(3) Space-Filling Curve+One-Dimensional Indexing Method

In this method, for example, two dimensions are converted into one dimension and partitioned by a space-filling curve such as a Z-class curve. Then, indexing using a binary tree, a B-tree, a skip list, a hash table, or the like, is performed. By configuring the routing table by this method, it is possible to refer to the routing table a calculation amount of $O(1)$ to $O(\log(N))$ (N=number of edges). In addition, by configuring the routing table using this method, it is possible to make a size of the routing table more compact and make an amount of data distributed from the registry server 20 to the vehicle 30 and a required memory size on an in-vehicle device of the vehicle 30 smaller.

The information provision unit 115 outputs predetermined information to the vehicle 30 traveling in the area to which the base is allocated by the base allocation unit 113. The information provision unit 115 outputs information related to the service provided to each vehicle 30 by the base server 10 to the vehicle 30.

Examples of the service provided to the vehicle 30 by the base server 10 include a distribution service of information (hereinafter referred to as "road information") regarding a falling object, an obstacle, road surface freezing, and the like, on a road detected by another vehicle, a driver's drowsiness detection notification service based on data (controller area network (CAN) data and an in-vehicle image) collected from the vehicle 30, and a distribution service of a dynamic map, an emergency vehicle, a surrounding dangerous vehicle, a passage waiting vehicle line of a high-speed entrance and exit, traffic accident information, road construction information, traffic regulation information, and the like. Note that the information provision unit 115 may provide various information to the vehicle 30 in response to a request from the vehicle 30 and may automatically provide various information to the vehicle 30 when the vehicle 30 enters a specific area.

For example, in a case of the distribution service of the road information, the information provision unit 115 determines whether or not there are a falling object, an obstacle, road surface freezing, and the like, on the road by analyzing the surrounding road image, sensor data, and the like collected from the vehicle 30. Then, the information provision unit 115 distributes the road information based on a determination result to the vehicle 30. In addition, in a case of the drowsiness detection notification service, the information provision unit 115 determines whether or not a driver is drowsy by analyzing the CAN data, the in-vehicle image, and the like collected from the vehicle 30. Then, the information provision unit 115 delivers this drowsiness detection result to the vehicle 30.

In a case where the vehicle 30 is traveling on the road link (border) straddling the plurality of areas, the information provision unit 115 may output information regarding the vehicle 30 to the base server 10 in an adjacent area. That is, in the information providing system 1, in a case where the vehicle 30 is traveling on a road link straddling a first area and a second area adjacent to the first area among the plurality of areas partitioned by the area partition unit 112, information regarding the vehicle 30 may be output from an information provision unit 115 of a base server 10 of a base allocated to one of the first area and the second area to an information provision unit 115 of a base server 10 of a base allocated to the other of the first area and the second area.

Here, the "information regarding the vehicle 30" is information unique to the vehicle 30 or the driver of the vehicle 30, and examples of the "information regarding the vehicle 30" include the CAN data, the in-vehicle image, and the like previously collected from the vehicle 30 in order to detect driver's drowsiness. In the present embodiment, such information is defined as "history information". By sharing the history information of the vehicle 30 between the base servers 10 in a plurality of adjacent areas as described above, it is possible to continuously use a service (for example, drowsiness detection notification service) that has been used before the vehicle 30 has moved even in a case where the vehicle 30 has moved between the areas.

The communication unit 12 is composed of, for example, a local area network (LAN) interface board, a wireless communication circuit for wireless communication, or the like. The communication unit 12 is connected to the network NW such as the Internet, which is a public communication network. Then, the communication unit 12 performs communication with the registry server 20 and the vehicle 30 by connecting to the network NW.

The storage unit 13 is composed of a recording medium such as an erasable programmable ROM (EPROM), a hard disk drive (HDD), and a removable medium. Examples of the removable medium include a disc recording medium such as a universal serial bus (USB) memory, a compact disc (CD), a digital versatile disc (DVD), and a BD (Blu-ray (registered trademark) disc). The storage unit 13 can store an operating system (OS), various programs, various tables, various databases, and the like.

For example, a routing table 131 generated by the routing table generation unit 114, history information 132 of the vehicle 30, past travel data of the vehicle 30 previously collected, and the like, are stored as necessary in the storage unit 13.

Registry Server

The registry server 20 is for accumulating the routing table 131 generated by the base server 10 and distributing the routing table 131 to the vehicle 30 as necessary. The registry server 20 is realized by a general-purpose computer such as a workstation or a personal computer.

Unlike the base server 10, only one registry server 20 is provided. That is, the registry server 20 is provided in a registry service base provided in a specific area. Note that the "registry service base" refers to a data center that distributes the routing tables 131 collected from the bases to the vehicle 30.

The registry server 20 includes a control unit (second processor) 21, a communication unit 22, and a storage unit 23, as illustrated in FIG. 3. Specific configurations of the control unit 21, the communication unit 22, and the storage unit 23 are similar to those of the control unit 11, the communication unit 12, and the storage unit 13 of the base server 10. The control unit 21 functions as a routing table registration unit 211 and a routing table distribution unit 212 through execution of a program stored in the storage unit 23.

The routing table registration unit 211 stores the routing table 131 input from the base server 10 in the storage unit 23. In addition, every time the updated routing table 131 is acquired from each base server 10, the routing table registration unit 211 stores the acquired routing table 131 in the storage unit 23

The routing table distribution unit 212 outputs the routing table 131 to the vehicle 30 traveling in the area to which the base is allocated. The vehicle 30 can specify the base server 10 allocated to the area and can make a service request and a response to an appropriate base server 10, by referring to the routing table 131. Note that the information provision unit 115 may provide the routing table 131 to the vehicle 30 in response to a request from the vehicle 30 and may automatically provide the routing table 131 to the vehicle 30 when the vehicle 30 enters a specific area.

Vehicle

The vehicle 30 is a mobile body capable of communicating with the outside. The vehicle 30 requests the routing table 131 from the registry server 20, for example, when an ignition switch of the vehicle is switched from a switch-off state to a switch-on state. Therefore, the vehicle 30 can specify the base server 10 with which the vehicle 30 should communicate in an area where the vehicle 30 is currently traveling.

As illustrated in FIG. 3, the vehicle 30 includes a control unit 31, a communication unit 32, a storage unit 33, and a sensor group 34. The control unit 31 is an electronic control unit (ECU) that comprehensively controls operations of various components mounted in the vehicle 30. The control unit 31 functions as an information collection unit 311 through execution of a program stored in the storage unit 33.

The information collection unit 311 collects various information by the sensor group 34 while the vehicle 30 is traveling. Examples of the information collected by the information collection unit 311 include the surrounding road image, the sensor data, the CAN data, and the in-vehicle image of the vehicle 30. The information collection unit 311 sequentially outputs these information to the base server 10.

The communication unit 32 is composed of, for example, a data communication module (DCM) or the like, and performs communication with the base server 10 and the registry server 20 by wireless communication via the network NW. For example, various data collected by the vehicle 30, the routing table 131 distributed from the registry server 20, and the like, are stored in the storage unit 33 as necessary.

The sensor group 24 includes, for example, a vehicle speed sensor, an acceleration sensor, a GPS sensor, a traveling space sensor (three-dimensional light detection and ranging (3D-LiDAR)), a millimeter wave sensor, a camera (image capturing device), a temperature sensor, a humidity sensor, a pressure sensor, and the like. The sensor group 24 outputs various detected information to the information collection unit 311.

Information Providing Method

Figure 6:
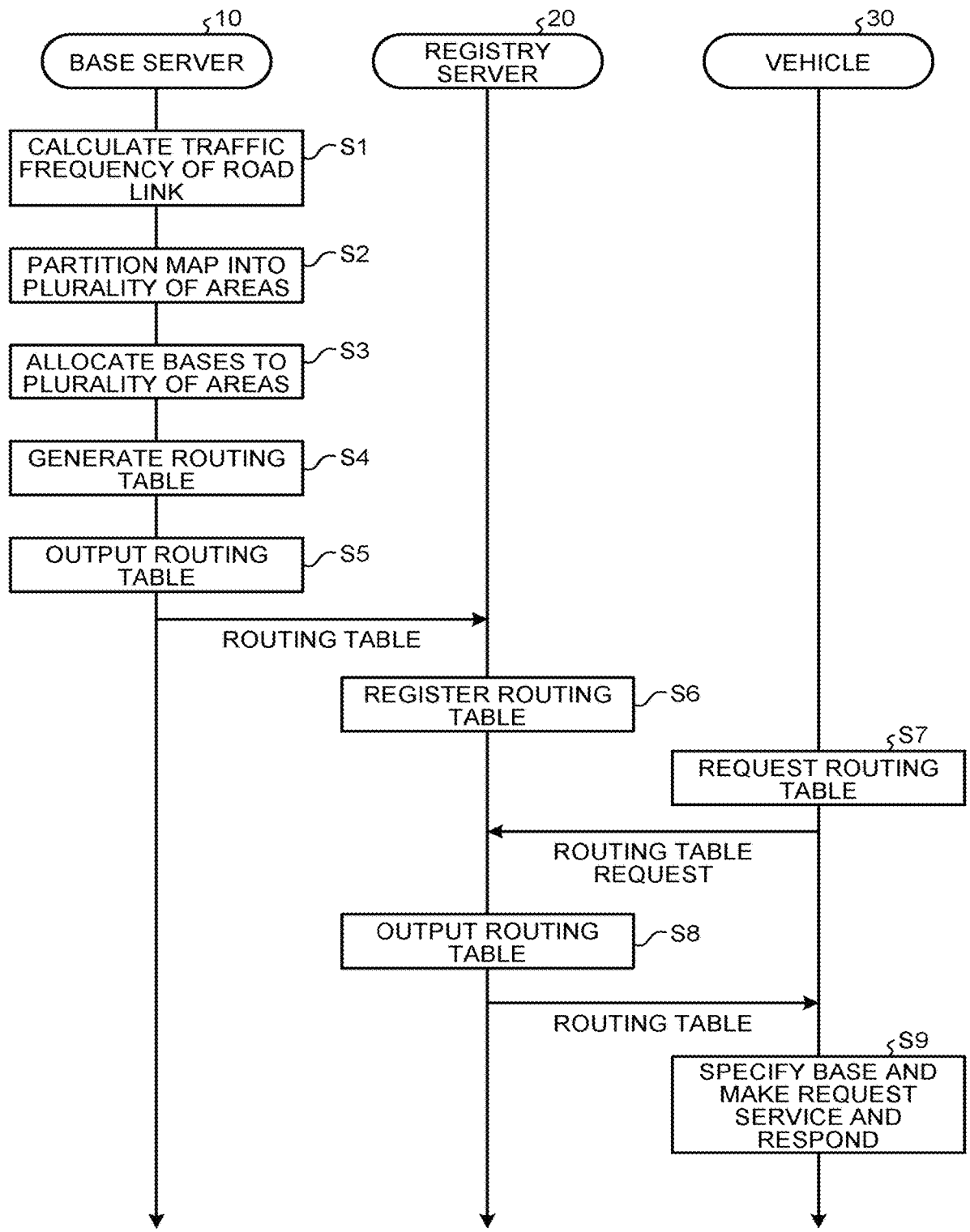
FIG. 6 is a flowchart illustrating an example of a flow of an information providing method executed by the information providing system according to the embodiment.

An example of a processing procedure of an information providing method executed by the information providing system 1 according to the embodiment will be described with reference to FIG. 6.

First, the traffic frequency calculation unit 111 of the base server 10 calculates the traffic frequency of the vehicle 30 on the road link included in the road map on the basis of the past travel data of the vehicle 30 (Step S1). Subsequently, the area partition unit 112 partitions the road map into the plurality of areas so that the total of the traffic frequency in the road link straddling each partitioned area becomes minimum (Step S2).

Next, the base allocation unit 113 allocates the base to each of the plurality of partitioned areas (Step S3). At this time, the base allocation unit 113 allocates the base to each of the plurality of partitioned areas so as to minimize the operation cost of the base server 10 while satisfying the preset latency constraint and communication bandwidth constraint between the vehicle 30 and the base server 10.

Subsequently, the routing table generation unit 114 generates the routing table 131 including the information on the bases allocated to the plurality of areas by the base allocation unit 113 (Step S4), and outputs the routing table 131 to the registry server 20 (Step S5).

Subsequently, the routing table registration unit 211 of the registry server 20 registers the routing table 131 input from the base server 10 by storing the routing table 131 in the storage unit 23 (Step S6). Subsequently, the control unit 31 of the vehicle 30 requests the routing table 131 from the registry server 20 (Step S7), for example, when the ignition switch of the vehicle 30 is switched from the switch-off state to the switch-on state. On receiving such a request, the routing table distribution unit 212 outputs the routing table 131 corresponding to the area in which the vehicle 30 travels to the vehicle 30 (Step S8).

The vehicle 30 that has acquired the routing table 131 specifies the base to the area, and makes a service request and a response to the base server 10 provided at the base (Step S9). As described above, the processing of the information providing method executed by the information providing system 1 ends.

As described above, according to the information providing system 1, the information providing device, and the information providing program according to the embodiment, it is possible to efficiently perform the data exchange when the vehicle 30 traveling all over the country communicates with the plurality of base servers 10.

That is, according to the information providing system 1, the information providing device, and the information providing program according to the embodiment, by partitioning the areas so as to minimize the traffic frequency between the respective areas, it is possible to minimize the data exchange between the areas.

For example, in an example of the area partition illustrated in FIG. 5, 354 edges (0.0267% of a total) of a total of 1,328,154 edges (road links) of the whole of Japan become borders (road links straddling two areas), and a total traffic frequency of the borders was 31.7618%/year. This means, for example, that 318,000 vehicles pass through the borders for one million vehicles 30 of the whole of Japan. In other words, this means that 0.6 vehicles 30 pass through the border per minute. Therefore, by using the information providing system 1, the information providing device, and the information providing program according to the embodiment, it is possible to sufficiently reduce a communication amount and a processing amount of data exchanged by the vehicle 30 between the respective areas.

In addition, the information providing system 1, the information providing device, and the information providing program according to the embodiment allocates the base so as to minimize the operation cost of each base server 10 while satisfying the latency constraint and the communication bandwidth constraint between each vehicle 30 and the base server 10, and it is thus possible to realize the data exchange between the vehicle 30 and the plurality of base servers 10 while suppressing the operation cost of each base server 10.

According to the present disclosure, it is possible to efficiently perform data exchange when the vehicle traveling all over the country communicates with the plurality of bases.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information providing system comprising:
   a vehicle;
   first servers in which each first server including a first processor with hardware is provided for each of a plurality of bases; and
   a second server including a second processor with hardware and a storage, wherein
   the first processor is configured to:
      calculate a traffic frequency of the vehicle on a road link included in a road map based on past travel data of the vehicle,
      partition the road map into a plurality of areas so that a total of the traffic frequency in a road link straddling each partitioned area becomes minimum,
      allocate each base to each of the partitioned areas,
      generate a routing table including information on the bases allocated to the partitioned areas, the routing table being a table in which an area of a target road map is partitioned into a predetermined number of meshes, a predetermined number of bits of pixels being allocated to each mesh, and for all road links included in each pixel, flags of bits indicating areas to which the road links belong being set, and
      output the routing table to the second processor,
   the second processor is configured to:
      store the routing table in the storage, and
      output the routing table stored in the storage to the vehicle traveling in the partitioned area to which the base is allocated upon receiving a request of the vehicle traveling in the partitioned area, and
   the vehicle includes an electronic control unit (ECU) that comprehensively controls operations of various components mounted in the vehicle including accessing one of the first servers using the routing table for requesting a network based service while travelling across the partitioned areas and receiving information of the network based service with the one of the first servers while travelling across the partitioned areas.

2. The information providing system according to claim 1, wherein the first processor is configured to allocate the base to each of the partitioned areas so as to minimize an operation cost of the base while satisfying a preset latency constraint between the vehicle and the base and a preset communication bandwidth constraint between the vehicle and the base.

3. The information providing system according to claim 1, wherein when the vehicle is traveling on the road link straddling a first area and a second area adjacent to the first area among the partitioned areas, the first server of the base allocated to one of the first area and the second area is configured to output information regarding the vehicle previously collected from the vehicle to the first server of the base allocated to another of the first area and the second area.

4. An information providing method comprising:
   calculating a traffic frequency of a vehicle on a road link included in a road map based on past travel data of the vehicle,
   partitioning the road map into a plurality of areas so that a total of the traffic frequency in a road link straddling each partitioned area becomes minimum,
   allocating each base of a plurality of bases to each of the partitioned areas, a first server being provided for each of the plurality of bases,
   generating a routing table including information on the bases allocated to the partitioned areas, the routing table being a table in which an area of a target road map is partitioned into a predetermined number of meshes, a predetermined number of bits of pixels being allocated to each mesh, and for all road links included in each pixel, flags of bits indicating areas to which the road links belong being set,
   outputting the routing table to a registry server to store the output routing table in a storage of the registry server,
   causing the registry server to output the routing table stored in the storage to the vehicle traveling in the partitioned area to which the base is allocated upon receiving a request of the vehicle traveling in the partitioned area, and
   comprehensively controlling, by an electronic control unit (ECU) of the vehicle, operations of various components mounted in the vehicle including accessing one of the first servers using the routing table for requesting a network based service while travelling across the partitioned areas and receiving information of the network based service with the one of the first servers while travelling across the partitioned areas.

5. The information providing method according to claim 4, further comprising allocating the base to each of the partitioned areas so as to minimize an operation cost of the base while satisfying a preset latency constraint between the vehicle and the base and a preset communication bandwidth constraint between the vehicle and the base.

6. The information providing device-method according to claim 4, further comprising, when the vehicle is traveling on the road link straddling a first area to which the base is allocated and a second area adjacent to the first area, outputting information regarding the vehicle previously collected from the vehicle to an information providing device in the second area.

7. A system comprising:
a vehicle; and
a non-transitory computer-readable recording medium with an executable program stored thereon, the program causing a processor with hardware to execute:
calculating a traffic frequency of a vehicle on a road link included in a road map based on past travel data of the vehicle,
partitioning the road map into a plurality of areas so that a total of the traffic frequency in a road link straddling each partitioned area becomes minimum,
allocating each base of a plurality of bases to each of the partitioned areas, a first server being provided for each of the plurality of bases,
generating a routing table including information on the bases allocated to the partitioned areas, the routing table being a table in which an area of a target road map is partitioned into a predetermined number of meshes, a predetermined number of bits of pixels being allocated to each mesh, and for all road links included in each pixel, flags of bits indicating areas to which the road links belong being set,
outputting the routing table to a registry server to store the output routing table in a storage of the registry server, and
causing the registry server to output the routing table stored in the storage to the vehicle traveling in the partitioned area to which the base is allocated upon receiving a request of the vehicle traveling in the partitioned area,
wherein the vehicle includes an electronic control unit (ECU) that comprehensively controls operations of various components mounted in the vehicle including accessing one of the first servers using the routing table for requesting a network based service while travelling across the partitioned areas and receiving information of the network based service with the one of the first servers while travelling across the partitioned areas.

8. The system according to claim 7, wherein the program causes the processor to execute allocating the base to each of the partitioned areas so as to minimize an operation cost of the base while satisfying a preset latency constraint between the vehicle and the base and a preset communication bandwidth constraint between the vehicle and the base.

9. The system to claim 7, wherein when the vehicle is traveling on the road link straddling a first area to which the base is allocated and a second area adjacent to the first area, the program causes the processor to execute outputting information regarding the vehicle previously collected from the vehicle to an information providing device in the second area.

* * * * *